US009194934B2

(12) United States Patent
Oka et al.

(10) Patent No.: US 9,194,934 B2
(45) Date of Patent: Nov. 24, 2015

(54) LOCATION ESTIMATION USING RADIO SCENE SIGNATURES

(75) Inventors: Anand Ravindra Oka, Waterloo (CA); Sean Bartholomew Simmons, Waterloo (CA); Christopher Harris Snow, Kitchener (CA); Robert George Oliver, Waterloo (CA); Ghasem Naddafzadeh Shirazi, Vancouver (CA)

(73) Assignee: BlackBerry Limited, Waterloo (CA)

( * ) Notice: Subject to any disclaimer, the term of this patent is extended or adjusted under 35 U.S.C. 154(b) by 930 days.

(21) Appl. No.: 13/416,698

(22) Filed: Mar. 9, 2012

(65) Prior Publication Data

US 2013/0234894 A1  Sep. 12, 2013

(51) Int. Cl.
  *G01S 5/02*  (2010.01)

(52) U.S. Cl.
  CPC .................................... *G01S 5/0252* (2013.01)

(58) Field of Classification Search
  USPC ............... 342/451, 457, 463, 464; 455/456.1, 455/456.6
  See application file for complete search history.

(56) References Cited

U.S. PATENT DOCUMENTS

| 6,782,265 | B2 | 8/2004 | Perez-Breva et al. |
|---|---|---|---|
| 8,106,828 | B1 | 1/2012 | Do et al. |
| 2004/0205509 | A1 | 10/2004 | Lou |
| 2005/0176442 | A1 | 8/2005 | Ju et al. |
| 2005/0246334 | A1 | 11/2005 | Tao et al. |
| 2006/0019679 | A1 | 1/2006 | Rappaport et al. |
| 2006/0183450 | A1 | 8/2006 | Cameron |
| 2007/0005589 | A1 | 1/2007 | Gollapudi |
| 2007/0139269 | A1 | 6/2007 | Chen et al. |
| 2008/0004036 | A1 | 1/2008 | Bhuta et al. |
| 2008/0076430 | A1 | 3/2008 | Olson |
| 2008/0176583 | A1 | 7/2008 | Brachet et al. |
| 2008/0186234 | A1 | 8/2008 | Alles et al. |
| 2009/0109095 | A1 | 4/2009 | Hido et al. |
| 2009/0210418 | A1 | 8/2009 | Arasu et al. |
| 2010/0094840 | A1 | 4/2010 | Donnelly et al. |
| 2010/0171993 | A1 | 7/2010 | Longobardi et al. |
| 2011/0269479 | A1 | 11/2011 | Ledlie |

FOREIGN PATENT DOCUMENTS

| WO | 0034799 A1 | 6/2000 |
|---|---|---|
| WO | 2005062066 A2 | 7/2005 |
| WO | 2006117587 A1 | 11/2006 |

OTHER PUBLICATIONS

European Search Report dated Aug. 17, 2012 from corresponding EP application No. 12158955.0.
Barker Brettell, Response to extended European Search Report dated Feb. 21, 2013, filed in European Patent Application No. 12158955. 0-1248.
Haiying Shen et al, Locality Sensitive Hashing Based Searching Scheme for a Massive Database, SouthEastcon, 2008, IEEE, Piscataway N.J., USA, Apr. 3, 2008, pp. 123-128. XP031245568.

(Continued)

*Primary Examiner* — Dao Phan
(74) *Attorney, Agent, or Firm* — Ridout & Maybee LLP

(57) ABSTRACT

Techniques for estimating a location of a portable electronic device are provided. The techniques represent radio scene information detected by a portable electronic device as a vector. The vector may then be used to retrieve similar vectors associated with known locations from a corpus. The known locations may then be used to estimate the location of the portable electronic device.

27 Claims, 10 Drawing Sheets

(56) References Cited

OTHER PUBLICATIONS

Canadian Intellectual Property Office, Examination Report dated Nov. 20, 2014, issued in Canadian Patent Application No. 2,808,108.

United States Patent and Trademark Office, Office Action dated Oct. 11, 2013, issued in U.S. Appl. No. 13/416,538.

Norton Rose Fulbright, Response to Office Action filed Jan. 3, 2014 in U.S. Appl. No. 13/416,538.

European Patent Office, Intent to Grant dated Jan. 2, 2014, issued in European Patent Application No. 12 158 955.0-1811.

LOCATION ESTIMATION USING RADIO SCENE SIGNATURES

TECHNICAL FIELD

The current application relates to systems, devices, and methods of estimating a location of a portable electronic device, and in particular to estimating the location based on a signature of received radio frequency (RF) signals received by the portable electronic device.

BACKGROUND

Location based services require a good knowledge of the geographical position of users, outdoors as well as indoors. A user's geographical position may be determined using a Global Positioning System (GPS), or more broadly Global Navigation Satellite System (GNSS), receiver of the user's portable electronic device, Outdoors, and in areas of good GPS signal reception, the location can typically be obtained, potentially with an accuracy of approximately 5 to 10 meters.

Positioning services are often unavailable indoors, or in areas of poor GNSS signal reception. In such cases the user has to be localized via other means like assisted GPS systems that use cellular or Wi-Fi radio signal strength indicator (RSSI) measurements to provide positioning information. Current techniques for position determination without GNSS using cellular or Wi-Fi measurements rely on a simple technique that uses a centroid of location fixes of previous users who have seen the same cellular tower or Wi-Fi access point. If a user sees multiple towers or access points, the positioning technique typically only uses the dominant tower or access point. That is, if multiple towers or access points are visible, only the tower or the access point having the strongest signal strength is used in determining the location. The resulting localization accuracy with cellular radio is typically relatively poor, for example approximately 1000 m.

One approach to generalize the above technique in order to incorporate information from multiple visible towers or access points is to assume a simple geometric path-loss model for radio propagation. The signal strength may then be used as a weighting factor in calculating a weighted centroid using the known locations associated with the visible towers or access points. However, such a model is typically very simplistic and cannot capture the complexities of multi-path, fading and occlusions, as a result the localization accuracy still remains relatively poor, for example in the order of 600 m.

It is desirable to have an improved technique of determining an estimate of a mobile's location based on information from multiple towers or access points.

BRIEF DESCRIPTION OF THE FIGURES

Further features and advantages of the present disclosure will become apparent from the following detailed description, taken in combination with the appended drawings, in which.

DETAILED DESCRIPTION

Figure 1:
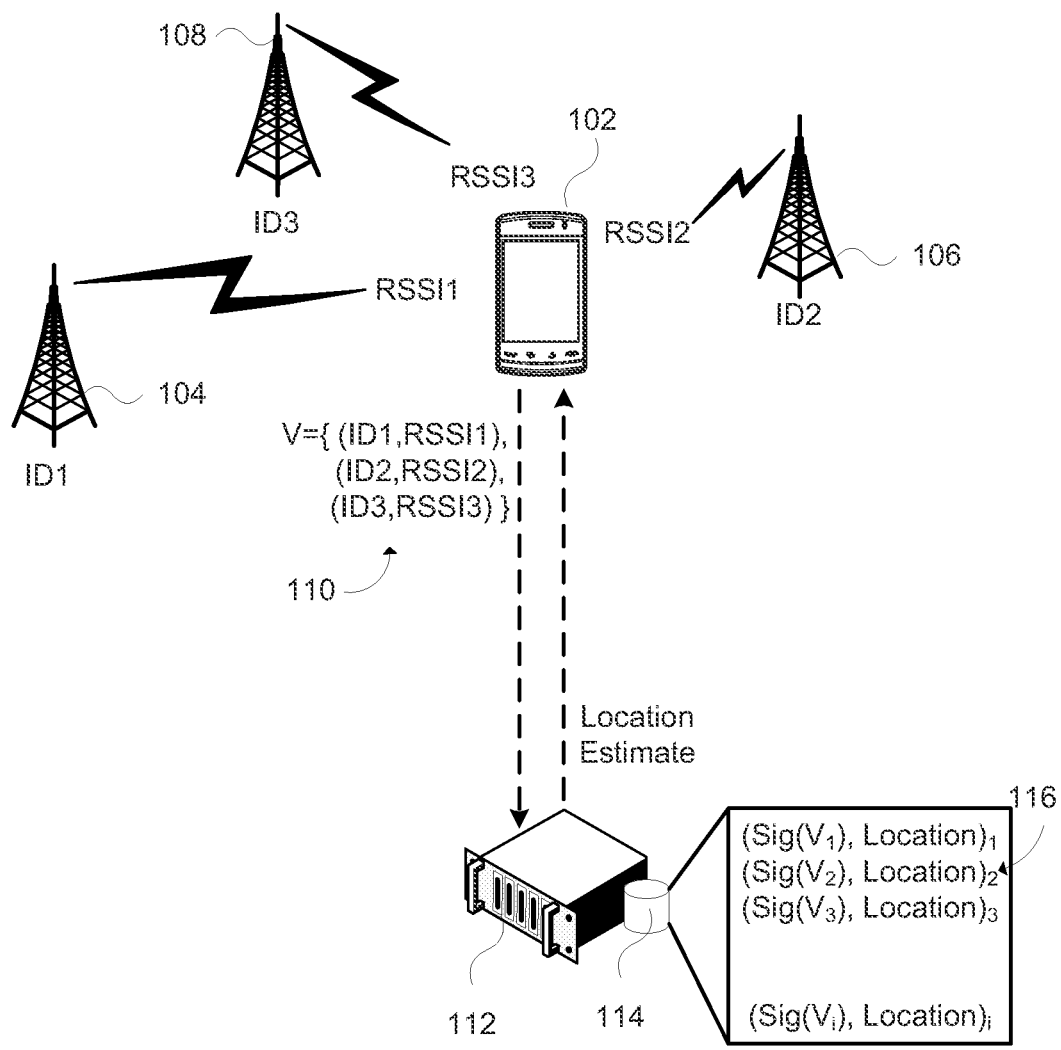
FIG. 1 depicts an environment in which location estimation may be used.

In accordance with the description there is provided a method of estimating a location of a portable electronic, the method device, the method comprising accessing a query signature vector of a radio scene identifying radio frequency transmitters and associated signal strengths detected at the portable electronic device; identifying one or more radio scene signature vectors based on a similarity with the query signature vector each of the identified one or more radio scene signature vectors having an associated location; and estimating the location of the portable electronic device based on the associated locations of the identified one or more signatures.

In accordance with the description there is further provided a device for estimating a location of a portable electronic device, the device comprising: a memory containing instructions; and a processor for executing instructions. The instructions when executed by the processor configure the device to access a query signature vector of a radio scene identifying radio frequency transmitters and associated signal strengths detected at the portable electronic device; identify one or more radio scene signature vectors based on a similarity with the query signature vector each of the identified one or more radio scene signature vectors having an associated location; and estimate the location of the portable electronic device based on the associated locations of the identified one or more signatures.

In accordance with the description there is further provided a computer readable memory containing instructions for estimating a location of a portable electronic device, the instructions which when executed by a processor perform the method of: accessing a query signature vector of a radio scene identifying radio frequency transmitters and associated signal strengths detected at the portable electronic device; identifying one or more radio scene signature vectors based on a similarity with the query signature vector each of the identified one or more radio scene signature vectors having an associated location; and estimating the location of the portable electronic device based on the associated locations of the identified one or more signatures.

A technique for estimating a location of a portable electronic device is described that can combine information about all cellular and Wi-Fi transmitters that are visible from a portable electronic device. The information about the transmitters visible by the portable electronic device is referred to herein as a radio scene. The technique produces an estimate of the location using the radio scene via Bayesian inference. The resulting accuracy of the estimate may be sufficiently high for use with location based services. For example, if the estimate is based only on cellular transmitters, the accuracy may be approximately 80 meters. If Wi-Fi or other transmitters are included in the radio scene, the accuracy may improve to, for example about 30 m.

As described in further detail herein, the technique relies upon the observation that the radio scene data is from a very high dimensional space but is very sparse. That is, the radio scene is considered, conceptually, as a vector having a dimensionality equal to the dimensionality of the space of the unique identifiers associated with individual transmitters. If the transmitters are identified using a media access control (MAC) address then the vector of the radio scene would have a dimensionality equal to the size of the MAC address space, that is the radio scene vector would have for example $2^{64}$ elements or $2^{48}$ depending on the size of the MAC address. Each element in a radio scene vector would comprise an RSSI value associated with the particular MAC address associated with the element as seen by the portable electronic device. As will be appreciated, a portable electronic device will only see a small number of transmitters at a time, and as such, most of the elements in the conceptual radio scene vector will have an associated value of zero.

Conceptually, portable electronic devices that 'see' similar radio scenes, that is receive signals of similar strengths from similar transmitters, will be in a similar location. As such, if a radio scene vector is associated with a known location, it can be used as an estimate of the location for the same or similar radio scene vectors. Advantageously, the use of the radio scene vector inherently incorporates RF information, such as multipaths, fading and occlusions since the radio scenes are based on actual received signals that may be subjected to approximately the same multipath fading and or occlusions at the particular location.

Conceptually, the use of radio scene vectors is advantageous as it allows vectors to be compared to determine close or similar vectors using well established vector techniques. However, in practice it is too complex computationally to compare radio scene vectors as described above due to the high dimensionality of the radio scene vectors. That is, it is computationally impractical to determine vectors that are close to each other when the vectors have large dimensions, such as $2^{64}$. However, the high dimensional radio scene vectors may be represented by a much lower dimensional signature using a compressive sensing signature technique described further herein. Advantageously, the compressive sensing signature technique is homomorphic so that vectors that are close in the high dimension space will also be close in the low dimension signature space.

The compressive sensing signature technique is based on compressive sensing techniques. Compressive sensing requires that a measurement matrix of size m×n be known a-priori in order to compress a vector, where n is the dimensionality of the sparse vector being compressed and m is the dimensionality of the compressed data. In the case of the radio scene vector, the dimensions of the measurement matrix would be too large, in the order of $2^{64}$, for practical applications, especially on a portable electronic device. However, as described further herein, although the compressive sensing signature technique is based on compressive sensing, it does not require the measurement matrix be known a-priori. As such, the location estimation technique described conceptually above, which required locating close vectors in a high dimensional space, may be used in practice using a signature of the high dimension vector, which can be easily generated using a compressive sensing signature technique.

FIG. 1 depicts an environment 100 in which location estimation as described further herein may be used. The environment 100 comprises a portable electronic device 102 and a plurality of radio frequency (RF) transceivers 104, 106, 108. Each transceiver 104, 106, 108 is associated with a unique identifier such as a machine access control (MAC) address. Additionally or alternatively the unique identifier may be a cellular ID, which may be composed of for example a base station identity code (BSIC), system identifier, network identifier, although any unique identifier may be associated with the individual transceivers. Although depicted as a tower, each of the transceivers 104, 106, 108 may be any type of RF transmitter, for which the portable electronic device can provide a measurement of the received signal strength. The transceivers may include for example, 2G cellular towers, 3G cellular towers, 4G cellular towers, Wi-Fi access points or routers, WiMax access points, Bluetooth transmitters, etc. The portable electronic device 102 receives RF signals transmitted by different transceivers and can identify the unique identifier of the respective transmitter and associate a received signal strength indicator (RSSI) value of the received RF signal with the unique identifier. The radio scene information, which is a set 110 of key-value pairs of unique transmitter IDs and associated RSSI values seen by the portable electronic device 102, may be used to generate a radio scene signature, which is a low dimension vector generated based on the radio scene information. The radio scene signature may be generated from the radio scene information at the portable electronic device or at a remote location, such as at a location estimation server 112.

The location estimation server 112 may use the radio scene signature to determine an estimate of the location of the portable electronic device 102. The location estimation server 112 includes a corpus of location information. The corpus of location information may be provided by, for example, a location database 114, or data structure, for storing and accessing the location information 116. The location information 116 comprises a plurality of radio scene signatures, each associated with a location at which the radio scene was seen. The location may be provided in various ways, such as a pair of latitude, longitude coordinates; GPS coordinates; street addresses; or street intersections. As described further herein, the location information can be generated and stored during a training phase of the system, or may be updated periodically from portable electronic devices that can determine their location using a technique other than the location estimation described herein. For example, the location information may be provided by a portable electronic device that can determine its location using GPS. The portable electronic device may provide the radio scene signature, or alternatively the radio scene information that can be used to generate the radio scene signature, it sees and its location as determined from its GPS receiver. The location server 112 then stores the received radio scene signature 116 and associated location, which can be used in determining a location estimate for a query radio scene signature used as in a location query from a portable electronic device 102.

Figure 2:
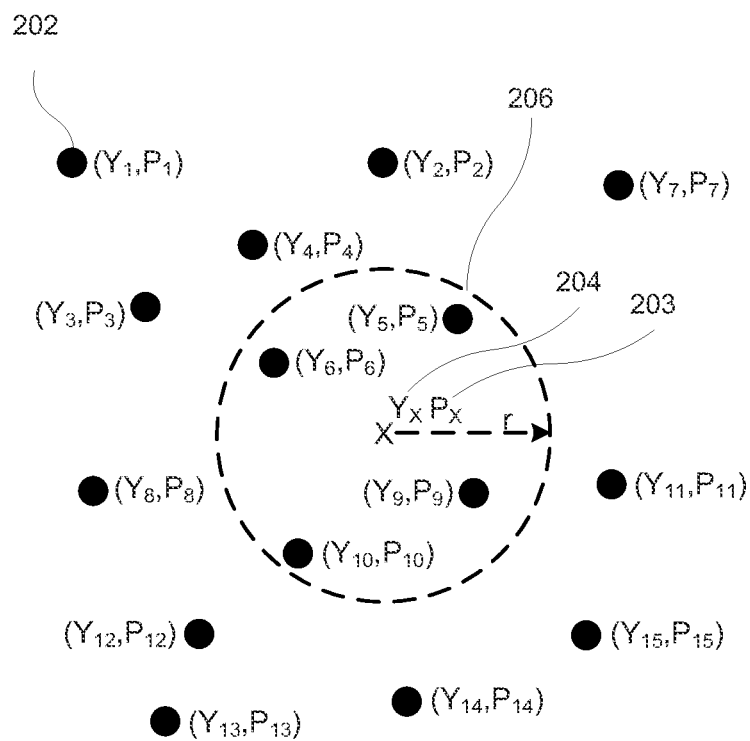
FIG. 2 depicts the conceptual process for determining a location estimate from known location information using a radio scene signature.

FIG. 2 depicts the conceptual process for determining a location estimate from known location information using a radio scene signature. In FIG. 2, each dot 202 depicts a known radio scene signature, that is a radio scene signature ($Y_i$) that is associated with a known position ($P_i$). In FIG. 2, it is assumed that each radio scene signature ($Y_i$) has 2 dimensions, and as such, can be plotted on an x-y plane. It is appreciated that in practice, the radio scene signature will have more dimensions than 2, for example a radio scene signature may have 32, 64, 128, 256 elements although other dimensions for the radio scene signature are possible.

A location ($P_x$) 203 can be estimated for a query radio scene signature ($Y_x$) 204 by determining neighbors of $Y_x$, that is one or more radio scene signatures ($Y_i$) that are close or similar to $Y_x$. Once the neighboring radio scene signatures are determined, the position $P_x$ can be estimated from the known positions ($P_i$) associated with the neighboring radio scene signatures.

As depicted in FIG. 2, the neighboring radio scene signatures may be determined as the radio scene signatures ($Y_5, Y_6, Y_9$ and $Y_{10}$) that are within a circle 206 having radius r centered on the unknown radio scene signature $Y_x$. Alternatively, the radio scene signatures to use in estimating a position for $Y_x$ could be determined as the k-closest radio scene signatures to $Y_x$. Once the neighboring, close, similar or closest, radio scene signatures are determined, the associated positions ($P_5, P_6, P_9$ and $P_{10}$ in FIG. 2) can be used to estimate the unknown position $P_x$. $P_x$ may be estimated, for example as an average of the associated positions ($P_5, P_6, P_9$ and $P_{10}$).

As will be appreciated, the location estimation described above with regards to FIG. 2, is a simplified explanation intended to describe the conceptual process of estimating a location using a radio scene signature vector of a radio scene. As described above, it would be prohibitively complex, computationally, to determine neighbors of the conceptual radio scene vectors, due to the large dimensionality of the radio scene vectors. However, a corresponding low-dimensional radio scene signature vector may be generated as described further below. The generation of the radio scene signature vector is homomorphic so that vectors in the high dimensional radio scene space that are close will also be close in the low-dimensional signature space.

Before describing estimating a location using a radio scene signature vector, the process is described with regards to estimating a location based on the conceptual high dimension radio scene vector. Suppose a user, or more particularly a portable electronic device, is located at a location $l \in R^2$ and receives signals from s cell towers or Wi-Fi access points, referred to collectively as transmitters, $t_1, \ldots, t_s$ with corresponding signal strengths of $r_1, \ldots, r_s$, respectively. The transmitter IDs $t_k$ are considered as 65-bit addresses, since it is a combination of the two 64-bit address spaces of Wi-Fi and cellular transmitters and therefore an additional bit is required to identify the address as either a 64-bit MAC address or 64-bit cellular ID. It is noted that 48-bit MAC address are also commonly used. It is possible to convert the 48-bit MAC address into a 64-bit MAC address by inserting two defined padding bytes, namely "FF" and "FE" in hexadecimal, between the first three bytes, which may form the organizationally unique identifier (OUI) and the last three bytes, which may provide an identifier that is uniquely assigned by the manufacturer. As such, when using both WiFi transmitters and cellular transmitters, the transmitter IDs are drawn from an alphabet of size $n=2^{65}$. The signal strengths $r_k$ may be expressed in Watts. Then, the radio scene vector d seen by the user's portable electronic device has a set of s non-zero key value pairs:

$$d \stackrel{\text{def}}{=} \{(t_k, r_k)\}_{k=1}^s, \quad (1)$$

where the transmitter IDs are interpreted as keys and the signal strengths as the values.

Assuming that the location l seen by a portable electronic device is known via GPS, then the tuple (l,d) is fully known, and is said to form one complete datum of location information. Obviously, one user or portable electronic device can make multiple radio scene measurements at different times and/or places, while keeping the portable electronic device's GPS on. Moreover multiple users can make such measurements. Thus a whole corpus of data consisting of a large number, for example, thousands, hundreds of thousands, millions or more, of complete data points of known location information will be available, which provides a corpus of location information:

$$C=\{(l,d)\}, \quad (2)$$

It is assumed that the corpus C obeys a joint density $p(l, d)=p(l)p(d|l)$. That is, the points in C are drawn independently, and identically distributed from $p(l, d)$ by nature. This may be written mathematically by the notation:

$$C \sim p(l,d), \quad (3)$$

Note that the distribution $p(l, d)$ captures, via the "prior" distribution $p(l)$, the preference of users to be present in certain areas more often than others, for example downtown vs hinterland. It also captures, via the "likelihood" $p(d|l)$, the probabilistic relationship between a location/and the radio scene d that is visible from the portable electronic device. The "prior" distribution $p(l)$, the "likelihood" $p(d|l)$ and the "a-posteriori probability" $p(l|d)$ can all be unambiguously recovered from $p(l, d)$ using Bayes theorem and elementary probability.

$$P(l,d)=p(d|l)p(l)=p(l|d)p(d), \quad (4)$$

$$p(l)=\int p(l,d)dd, \quad (5)$$

$$p(d)=\int p(l,d)dl, \quad (6)$$

Now suppose a test user U comes along, who observes the radio scene d but does not know the position l, for example due to a lack of GPS signal reception, either due to poor signal reception or when the GPS receiver has been disabled to conserve power. The knowledge of the corpus C provides some partial knowledge of the density $p(l, d)$. As the size of the corpus tends to infinity, the corpus tends to providing an exact understanding of $p(l, d)$.

Assuming the corpus provides an exact understanding of $p(l, d)$, an answer for the user's position may be provided in various ways, depending on the requirement of the answer. For example, the requirement may be that the expected, or mean, value of the squared error (MSE) is required to be as low as possible, then the aposteriori mean provides the optimal location estimate:

$$\hat{l}_{AP_{mean}} = E_{p(l|d)}[L|D=d)] \quad (7)$$

Note that in equation 7 the expectation is over all possible locations where localization can be requested and takes into account the prior distribution $p(l)$.

If, however, it is desired to ensure that the probability of mis-detecting the location, quantized to some suitably small grid, is as small as possible, then the estimate is:

$$\hat{l}_{AP_{argmax}} = \underset{l}{\operatorname{argmax}} [p(l|d)], \quad (8)$$

Further, if it is desirable to disregard the "prior" distribution $p(l)$ on the locations and simply make an estimate based on the evidence d, then the optimal estimate may be provided according to:

$$\hat{l}_{ML} = \underset{l}{\operatorname{argmax}} [p(d|l)], \quad (9)$$

The above equations 7, 8, 9 provide various different location estimates assuming a complete knowledge of $p(l, d)$, however a complete knowledge of p(l, d) is not possible from a finite corpus C, and as such it is necessary to provide an estimate of p(l, d).

It is possible to provide an estimate of p(l, d) using a model based approach. However, the model based approach would provide a simplistic model since it typically would ignore effects such as fast fading, multipath and occlusions. A model that accounts for such effects would require a large number of additional parameters and as such becomes difficult to solve. As such, a non-model based approach for estimating p(l, d) is required.

An estimate of p(l, d) may be obtained directly from the data itself via a "frequency" interpretation of probability. This ensures that the resulting estimates of position are considerably more accurate and do not suffer from systematic modeling errors. Such non-parametric methods work well when the data corpus is very large, as may be the case for the location data corpus since millions or billions of users are using portable electronic device all over the world every day.

In providing an estimate of p(l,d) using a model-free approach, any side information that is available regarding the density p(l, d) is thrown away and not used. As a result such methods do not make as efficient use of the available data as do the model-based methods. However, the current application may use an asymptotically infinite amount of data since millions of users get GPS fixes every day and the data keeps building up. As a result, concerns of data paucity are not justified, and the model-free approach quickly becomes suitable as the size of the corpus grows.

A further concern of the model-free approach is the computational complexity of the approach, which scales linearly with the size of the corpus if no optimization techniques are used. This linear scaling is in contrast to the model based approach which has a constant computational complexity. However, the size of the corpus may be maintained to provide an acceptable amount of information on p(l, d), while still maintaining computational complexity being manageable. For example in a moderate sized city, a corpus of about 20000 points may be considered sufficient to provide an adequate balance between location estimation and processing complexity. Moreover the linear scaling of complexity can be avoided, and converted to log-linear scaling, if the corpus is pre-processed and stored in a data structure known as a vantage point tree (VP-tree). Finding the nearest neighbour in a VP-tree takes roughly a constant complexity irrespective of the size of the tree, while search for the nearest neighbour from a simple list takes a complexity that is proportional to the size of the list. While the computation of the VP-tree is a complex task, it needs to be done only infrequently whenever the data corpus changes.

In the following description of the model-free approach the following notation is used. For any vector a let $a_i$ denote the $i^{th}$ element of a. Let $B_\delta^\infty(l, d)$ denote an $L^\infty$ ball, i.e. a hypercube, around (l, d) defined as:

$$B_{\delta,\epsilon}^\infty(l, d) \stackrel{def}{=} \left\{ l', d' : \max_i |l_i - l'_i| \le \delta, \max_i |d_i - d'_i| \le \epsilon \right\} \quad (10)$$

Analogously the balls $B_\epsilon^\infty(d)$ and $B_\delta^\infty(l)$ are defined as:

$$B_\epsilon^\infty(d) \stackrel{def}{=} \left\{ d' : \max_i |d_i - d'_i| \le \epsilon \right\} \quad (11)$$

-continued $$B_\delta^\infty(l) \stackrel{def}{=} \left\{ l' : \max_i |l_i - l'_i| \le \delta \right\} \quad (12)$$

Note that $B_{\delta,\epsilon}^\infty(l, d)$, $B_\epsilon^\infty(d)$, $B_\delta^\infty(l)$ live in distinct spaces. Let $C|B_{\delta,\epsilon}^\infty(l, d)$ be the restriction of the corpus C to the ball $B_{\delta,\epsilon}^\infty(l, d)$, which can be obtained by throwing away all the elements that are outside the ball. Let $C|B_\epsilon^\infty(d)$ be the restriction of the corpus C such that any point whose d-coordinate is not in the ball $B_\epsilon^\infty(d)$ is discarded. Finally, suppose $A \subseteq C$ is any subset of the corpus C. Then let $A_l$ denote a set of points in the l-space ($\mathbb{R}^2$) obtained by taking the l-component of every component in the set A.

With the above, the basic premise of the model-free approach is the frequency interpretation of probability, which is a consequence of the strong law of large numbers and the definition of the probability "density":

$$p(l, d) = \lim_{\substack{N \to \infty \\ \delta, \epsilon \to 0}} \frac{|C|B_{\delta,\epsilon}(l, d)|}{N \, Vol[B_{\delta,\epsilon}(l, d)]}, \quad (13)$$

Equation 13 implies that:

$$p(l \mid d) = \lim_{\substack{N \to \infty \\ \delta, \epsilon \to 0}} \frac{|C|B_{\delta,\epsilon}(l, d)|}{|C|B_\epsilon(d)|Vol[B_{\delta,\epsilon}(l, d)]}, \quad (14)$$

And:

$$C|B_\epsilon(d)_{X_\epsilon \to 0} \sim p(l/d), \quad (15)$$

Equation 15 provides that the set of points $C|B_\epsilon(d)_X$ is in the limit distributed according to the aposteriori density p(l/d). Consequently, any statistical operation that needs to be performed using p(l/d) can be performed simply by using the samples in $C|B_\epsilon(d)_X$. Thus, for example, the position estimate of equation 7 may be obtained by taking the average of the points in $C|B_\epsilon(d)_X$. Of course since in practice the corpus size N is finite, the number of points in $C|B_\epsilon(d)_X$ is limited. With a small enough $\epsilon$, the set $C|B_\epsilon(d)_X$ becomes empty and hence $\epsilon$ cannot really be allowed to go to zero. As such, the above sample based calculation, for some $\epsilon > 0$ will be an approximation, albeit typically a very good one.

From the above, it is clear that a location estimate can be determined from some radio scene vector d. However, the radio scene vector is from a space of dimension $n=2^{65}$. Manipulation in this space, such as required by the restriction $C|B_\epsilon(d)$, is computationally infeasible. Thus it is necessary to have a systematic method of reducing the dimension of the radio scene vector (d) while still maintaining the relationship between vectors. This is achieved by generating a radio scene signature vector of low dimensionality from the high dimension radio scene vector (d) using a compressive sensing signature technique.

A radio scene signature vector may be generated from radio scene data from an n-dimensional space that is representable by a set of key-value pairs. The radio scene information used to generate the radio scene signature vector may comprise a set of non-zero key-value pairs of a sparse radio scene vector. Each key-value pair of the radio scene data comprises a unique transmitter ID and associated value indicative of the received signal strength from the transmitter at the portable electronic device.

A radio scene signature vector comprises m elements. The number of elements, m, may be determined based on the dimensionality of the sparse data, and the expected sparsity of the sparse data. As an example, m=128 may provide an acceptable signature in generating radio scene signatures, although other signature sizes are possible. The signature vector may be generated by calculating values for each of the m individual elements.

Each of the m elements of the radio scene signature vector is equal to a summation of one or more terms. Each of the one or more terms in the summation is associated with a respective key-value pair of the key-value pairs for which the radio scene signature vector is being generated, and is equal to, or proportional to if a weighting factor is used, the value of the pair multiplied by a pseudo-random number. Each of the pseudo-random numbers used in calculating the summation terms is generated from a seed based on a unique value, which may be the key, of the key-value pair and a unique value associate with the element of the signature being calculated, which may be the index of the signature element being calculated.

Figure 3:
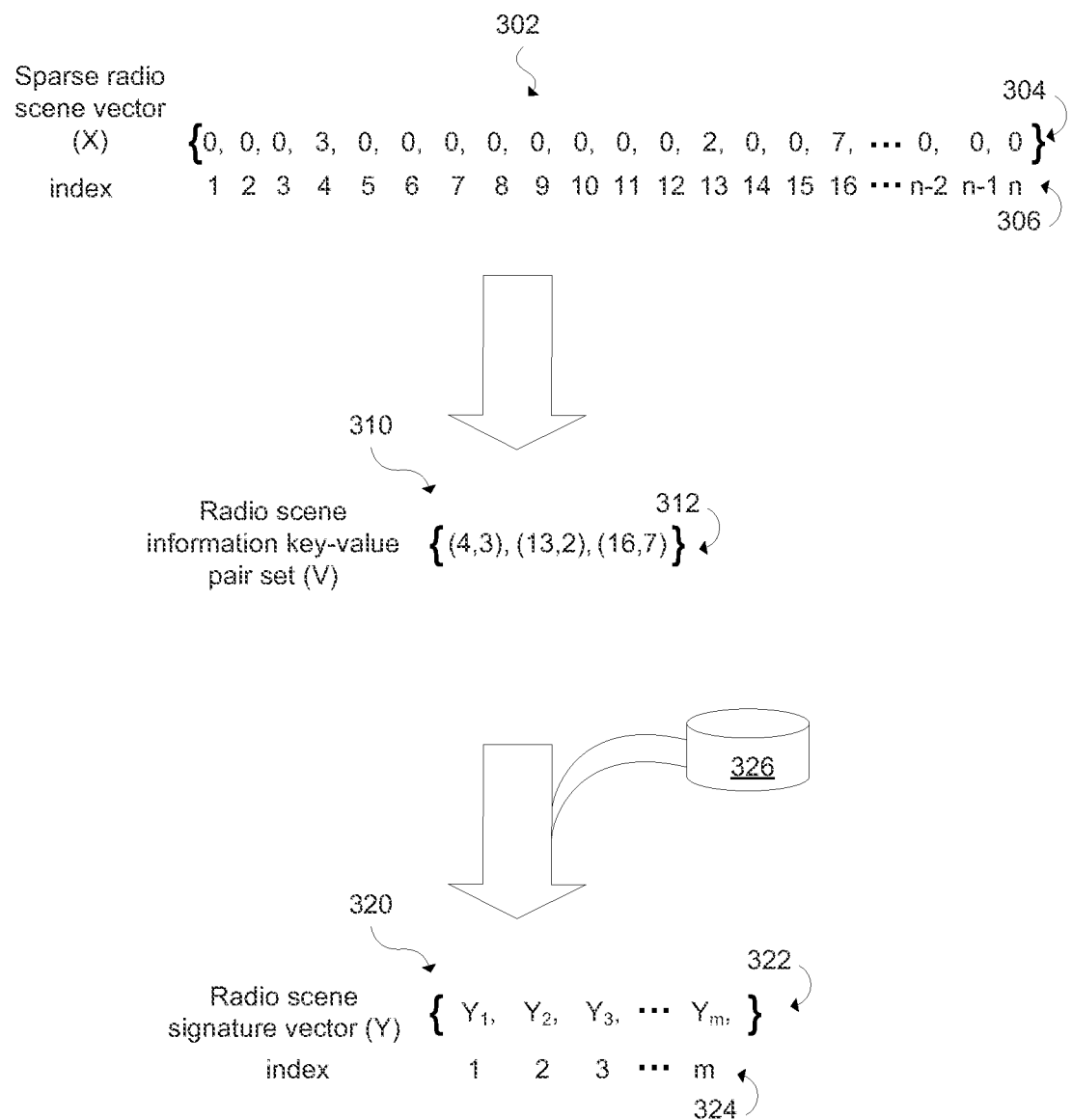
FIG. 3 depicts the various data elements in the compressive sensing signature technique as applied to data corresponding to a radio scene vector.

FIG. 3 depicts the various data elements in the compressive sensing signature technique as applied to data corresponding to a radio scene vector that is sparse in its own domain. As depicted, there are three types of variables, namely a sparse radio scene vector (X) 302, a set of key-value pairs (V) 310, and the compressed radio scene signature vector (Y) 320. The sparse radio scene vector may be a vector having $2^{65}$ elements as described above. Alternatively, the sparse radio scene vector may have different dimensionality based on the type and number of identifiers used in the compressed radio scene signature. The sparse radio scene vector has an element for each possible transmitter address and an associated RSSI value. The sparse radio scene vector typically only exists conceptually.

The sparse radio scene vector X has n=$2^{65}$ elements 304, each of which is identified by an index 306 that is, or is associated with, a unique ID of a transmitter. The value of each element 304 is, or is associated with, an RSSI value from the transmitter identified by the element index. The set 310 of key-value pairs V 310 comprises key-value pairs 312 from the radio scene vector X. Each of the pairs of the set 310 comprises a non-zero value from the radio scene vector and the associated index. That is, the set 310 of key-value pairs 312 provides all of the non-zero values of the radio scene vector 302. The key of the key-value pair is the index or associated transmitter ID of a non-zero element of X, and the associated value of the key-value pair is the value of the respective element in X, which provides an indication of the strength of the signal received at the portable electronic device from a transmitter. As can be seen, the number of key-value pairs in the set V is equal to the sparsity of X, that is the number of non-zero elements of X, which for sparse data will be much smaller than the dimension of X.

The radio scene signature vector Y 320 comprises a number (m) of elements, with m<<n. Each element 322 of the radio scene signature vector Y is associated with an index value 324. The value of each element 322 is calculated based on the key-value pairs in the set V, as opposed to the full radio scene vector X, as described further below. As described further with reference to FIG. 6, the value of each element 322 may also be calculated taking into account synonym information 326 of the different keys, which provides an indication of similar keys to allow aliasing of radio across similar keys.

Since the dimensionality of the radio scene signature vector is much less than the sparse radio scene vector, it is much easier, computationally, to work with. Further, due to the homomorphic nature of the compressive sensing signature technique used to generate the radio scene signature vector from the radio scene information, the low-dimension signature can be used in place of the high-dimension sparse radio scene vector.

As should be clear, an actual sparse radio scene vector X does not need to be provided to determine the key-value pair set V. Rather, the key-value pair set V can be constructed directly from measurements of received RF signals at the portable electronic device.

Each element of the radio scene signature vector Y can be directly calculated from the set of key-value pairs V, without requiring the large measurement matrix be known a-priori. If the sparse radio scene vector X has s(X) non-zero elements, then the set of key-value pairs V provides a list of s(X) key-value pairs of the form (key K,value P). Since the sparsity of X may vary in different realizations of X, the number of key-value pairs in the set V is described as a function of X, namely s(X). Each element of the radio scene signature vector may be directly calculated as:

$$Y_i = \sum_{\ell=1}^{s(X)} R(f(i, K_\ell)) \cdot P_\ell \cdot G(K_\ell) \qquad (16)$$

In (16) above, $K_l$ is the key of the $l^{th}$ element's key-value pair in the set V and $P_l$ is the associated value of the $l^{th}$ key-value pair in the set V. $R(f(i,K_l))$ is a value returned from a unit normal (N(0,1)) pseudo-random number generator using a seed of $f(i,K_l)$. It is noted that the pseudo-random number generator will generate the same value when given the same seed value. The function $f(\cdot)$ may be a hash function of the tuple $(i,K_l)$, such as:

$$f(i,K_l)=\text{hash}(str(i)+str(K_l)) \qquad (17)$$

In (17) above str(•) and hash(•) may be common functions for generating a string from a variable, and generating a hash from a string respectively. Further the '+' operator may be the concatenation of strings.

The function $G(K_l)$ in (16) above provides an additional gain function, which may be used to provide flexibility, for example by providing flexibility in deprecating certain elements in the key-value pair set V.

From (16) above, it can be seen that each individual element of the radio scene signature vector Y is calculated as a summation of terms, with each term of the summation calculated from the value of a respective key-value pair multiplied by a pseudorandom number generated based on the key associated with the respective value and a unique value associated with the respective element of the signature vector being calculated. As depicted above in (16), the unique value associated with the respective element of the radio scene signature vector being calculated may be provided by the index of the element being calculated, however other values are possible.

From the above, it is clear that the calculation of the radio scene signature vector Y is done without requiring the generation of the measurement matrix Φ, whose size would be proportional to the dimensionality of the sparse radio scene vector X, which may be extremely large. As such, the large storage requirement for calculating the radio scene signature vector is eliminated. Further, the calculation of the radio scene signature vector only involves non-zero data, and hence unnecessary multiplication, i.e. multiplication by zero, and calls to the random number generator are avoided, thereby reducing the computational complexity of generating the radio scene signature vector.

Strictly speaking equation (16) above is not an exact implementation of the compressive sensing technique since the normal variables provided by the pseudo-random number generator are not completely independent of the radio scene data as is the case of the measurement matrix Φ. However, given the benefits of the compressive sensing signature technique described by (16), any dependence of the normal variables on the radio scene data may be acceptable. Further the dependency is only via the seed, and hence results in only very low level long range correlations that may be virtually undetectable when using an adequate pseudo-random number generator.

Figure 4:
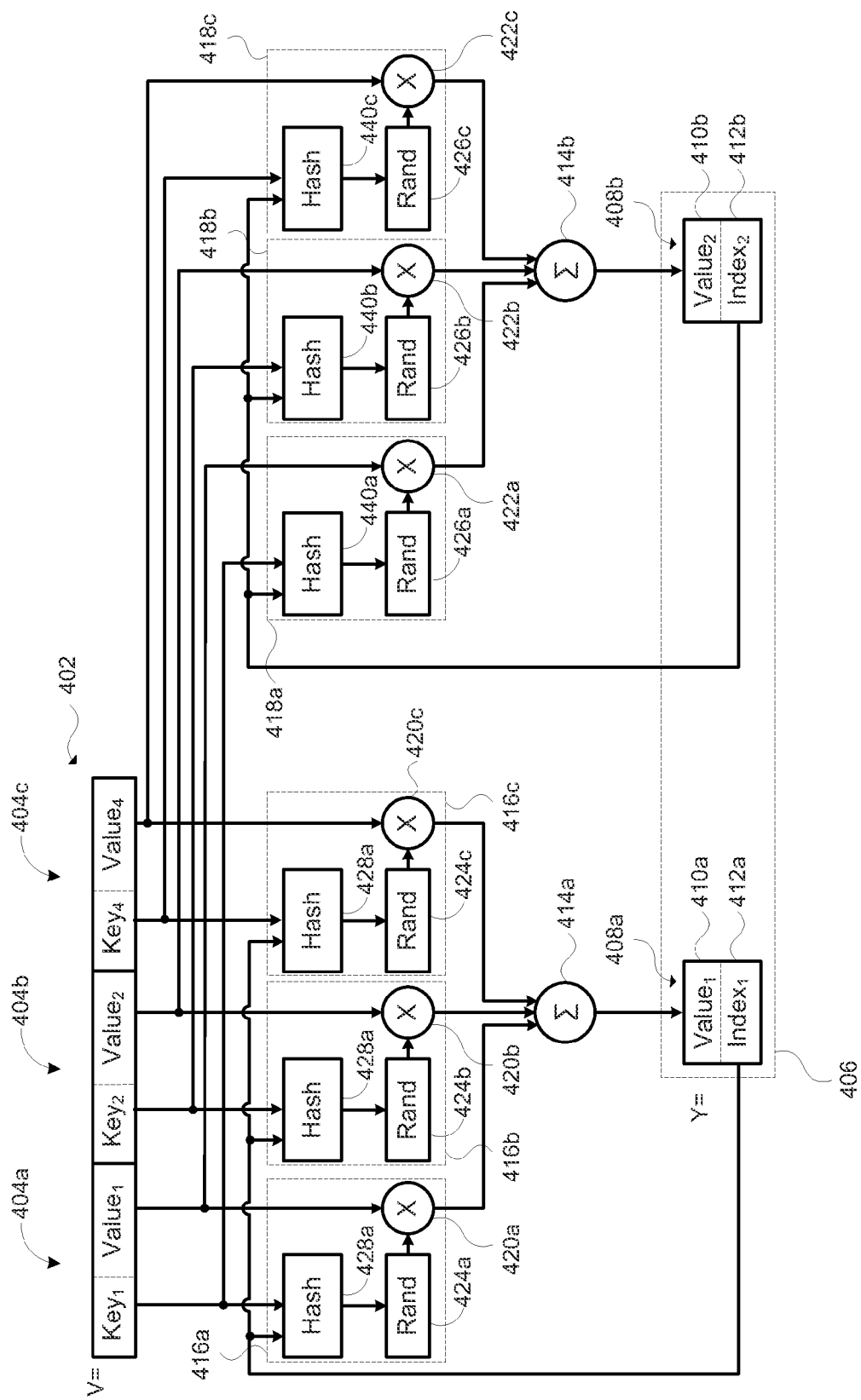
FIG. 4 depicts generating a radio scene signature vector.

FIG. 4 depicts generating a radio scene signature vector. FIG. 4 only depicts calculating two elements of the radio scene signature vector; however, each element of the radio scene signature vector may be calculated in the same manner.

As depicted in FIG. 4, the key-value pair set V 402 has three elements 404a, 404b, 404c of respective key-value pairs. The radio scene signature vector Y 406 is depicted as having two elements 408a, 408b each having a value 410a, 410b and associated index value 412a, 412b.

As is clear from FIG. 4, each value 410a, 410b of the radio scene signature vector is calculated as a summation 414a, 414b, of a plurality of terms 416a, 416b, 416c and 418a, 418b, 418c respectively. The number of terms in each summation 414a, 414b is equal to the number of key-value pairs in the set V. Each key-value pair in the set comprises an RSS value and associated unique ID for each transmitter visible from a portable electronic device. Each term 416a, 416b, 416c, 418a, 418b, 418c used in the summation may be calculated as a multiplication 420a, 420b, 420c, 422a, 422b, 422c of a respective value of the respective key-value pair 404a, 404b, 404c of the set V and a random number 424a, 424b, 424c, 426a, 426b, 426c generated from a pseudo-random number generator. The pseudo-random number generator may generate each of the random numbers 424a, 424b, 424c, 426a, 426b, 426c using a respective seed value. Each of the seed values 428a, 428b, 428c, 430a, 430b, 430c may be generated from the key of the respective key-value pairs 404a, 404b, 404c of the set V and the respective index 412a, 412b, or unique identifier, of the element of the radio scene signature vector being calculated.

The process of FIG. 4 is intended to clarify the conceptual generation of the radio scene signature vector, and it should be appreciated that other processes for the generation are possible. For example, each term used in the summation is depicted as being calculated in parallel; however, it is contemplated that the terms could be calculated sequentially. Further, the multiplication of the random numbers by the respective values could be accomplished by adding the random numbers together a respective number of times based on the value. Further, although not depicted in the figure, the calculation of each term could include a weighting factor determined based on the key associated with the term.

Figure 5:
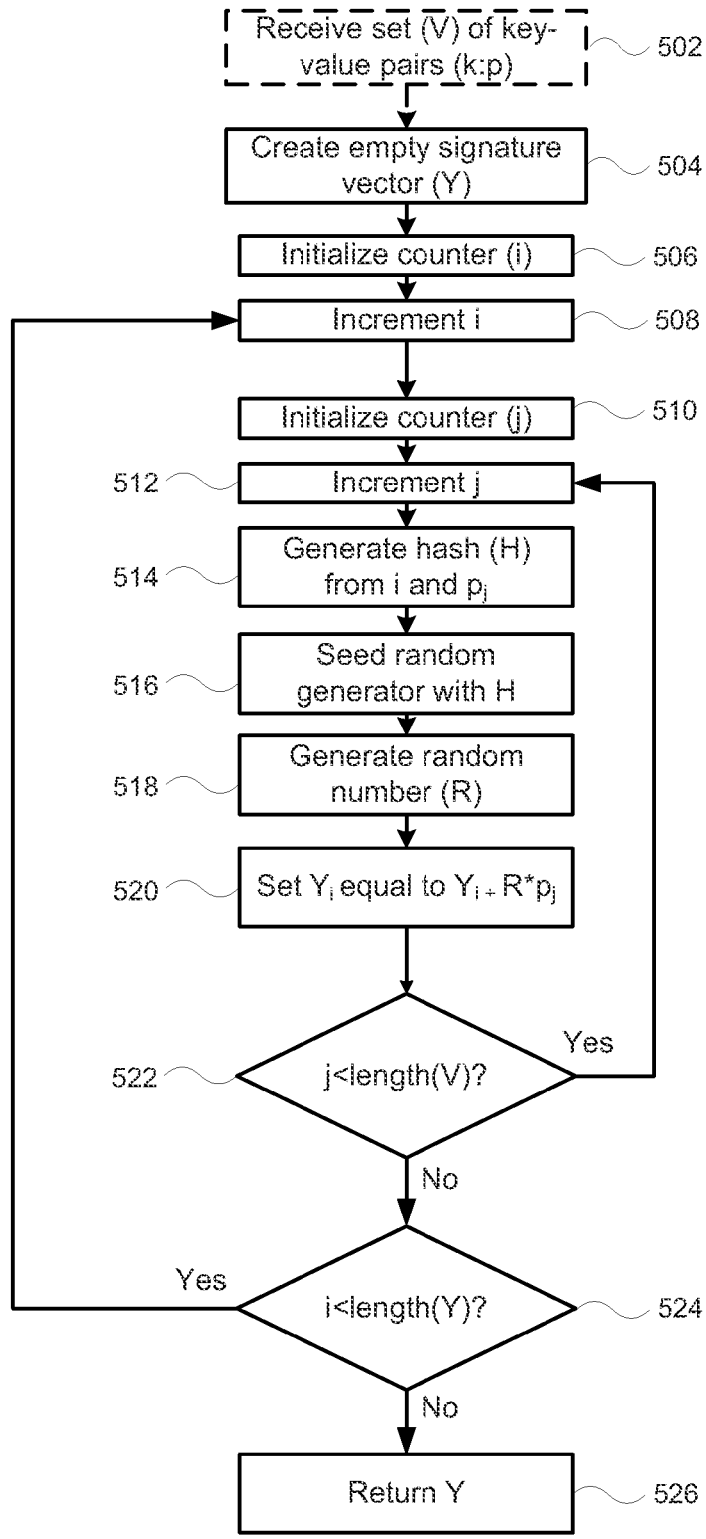
FIG. 5 depicts a method of generating a radio scene signature vector.

FIG. 5 depicts a method of generating a radio scene signature vector. The method 500 may be used to generate a radio scene signature from a radio scene comprising a set of key-value pairs V. The set V may comprise the RSSI values and associated unique IDs of each transmitter that is visible from a portable electronic device. The set V comprises at least one key-value pair, wherein each key is a respective index or identifier of a transmitter and the associated value is an RSSI value of the particular transmitter.

The set of key-value pairs V comprising one or more key-value pairs may be received (502), which may include retrieving the data for example from a storage device. The set V has k pairs, where k>=1. The method 500 creates an empty radio scene signature vector (Y) of m elements (504). The empty radio scene signature vector Y has m zero-valued elements.

The method initializes a first counter (i) (506). The counter (i) is used to loop over each element in the radio scene signature vector Y and calculate the element's value. Once the counter is initialized, it is incremented (508). It is noted that in the method 500 the counter (i) is initialized to one less than the first index of the radio scene signature vector Y so that when it is incremented, the first element of the radio scene signature vector Y will be referenced. Further, it is noted that the initialization and incrementation of the counter (i) may be done implicitly, for example by using a 'for-next' loop, or other programmatic means. Once the first counter (i) is initialized/incremented, a second counter (j) is similarly initialized (510) and incremented (512). The second counter (j) is used to loop over each element in the set V to calculate the summation terms from the key-value pairs of the set V.

Once the second counter (j) is initialized/incremented a hash (H) is generated from the concatenation of the value of the first counter (i) and the key of the $j^{th}$ key-value pair of the set V (514). Once the hash (H) is calculated, it is used as the seed for a random number generator (516), and a pseudo-random number (R) is generated from the seeded random number generator (518). Once the random number (R) is generated, the $i^{th}$ element of the signature vector V, which was initialized to zero, is set equal to $Y_i+R*p_j$, where $p_j$ is the value of the $j^{th}$ key-value pair of the set V (520). Once the terms have been summed, it is determined if the second counter (j) is less than the number of key-value pairs in the set V (522). If the counter (j) is less than the number of elements in the set V (Yes at 522), then there are further elements in the set V to use in calculating the element in the signature vector Y and the method returns to increment the second counter (j) and proceeds to incorporate the next key-value pair from the set V in the calculation of $Y_i$. If the counter (j) is not less than the number of elements (No at 522), than there are no more key-value pairs in the set V to use in calculating $Y_i$ and the method determines if the first counter (i) is less than the number of elements in the radio scene signature vector Y (524). If the counter (i) is less than the number of elements in the radio scene signature vector Y (Yes at 524), then there are further elements of the radio scene signature vector Y to calculate and the method increments the first counter (i) (510) and calculates the value of the next element of the radio scene signature vector Y. If the first counter (i) is not less than the number of elements in the signature vector Y (No at 524), then all of the elements of the radio scene signature vector Y have been calculated and the radio scene signature vector Y is returned (526).

The method 500 described above may generate a radio scene signature vector from a set of key-value pairs of radio scene information of the transmitters visible from a portable electronic device.

The radio scene signature vector described above treats each unique index or key in the key-value set as a separate unrelated transmitter. However, it is possible that some transmitters are located in the same location, for example on the same tower. It could be desirable to be able to incorporate the information of similarly located transmitters. This can be achieved through the use of synonym information indicating which transmitters, or more particularly which transmitter IDs, are located in the same or similar locations. The synonym information may then be used to generate the same signature for the different transmitter IDs. As such, the radio scene signature vector may be generated with aliasing across similarly located transmitter IDs.

When generating radio scene signatures with aliasing, it is necessary to have some indication of the similarity between elements within the sparse data space. For example, it is desirable to know that a transmitter having a particular transmitter ID is located on the same physical tower as another transmitter having a unique transmitter ID. This synonym information may be provided separately, or in some cases may be provided by the unique IDs. For example, in cellular networks, transmitter IDs that have a similar location typically have IDs that differ only in the last 16 least significant bits.

Figure 6:
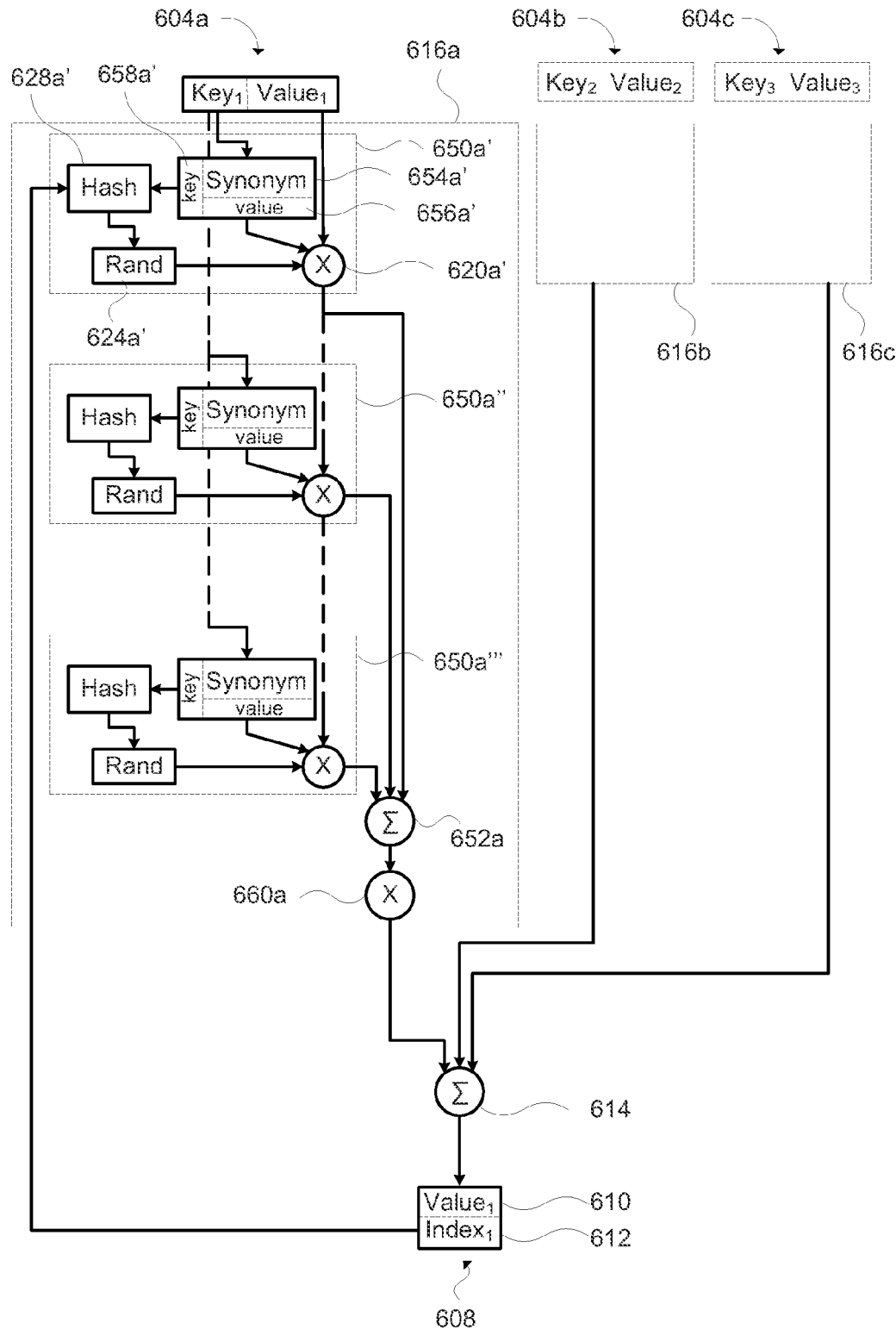
FIG. 6 depicts schematically the generation of a radio scene signature with aliasing.

FIG. 6 depicts schematically the generation of a radio scene signature vector with aliasing. FIG. 6 only depicts the calculation of a single term 606a used in the summation 614 for a value 610 of one element 608 of the radio scene signature vector. Each of the other terms 616b, 616c could be calculated in a similar manner as shown for term 616a. Similar to the above, each term 616a, 616b, 616c corresponds to a key-value pair of the set being processed. Although three key-value pairs are depicted in FIG. 6, it will be appreciated that fewer or additional terms may be used in the summation 614 for the element of the radio scene signature depending on the number of key-value pairs in the set being processed.

As described above, each term in the summation of a signature element is determined using a respective key-value pair from the set of key-value pairs. When determining the terms for radio scene signatures using aliasing, terms of key-value pairs having no synonym are calculated in the same manner as described above. However, if the key-value pair has one or more synonyms, then the term is calculated as a summation of terms based on each of the synonymous terms.

In FIG. 6, it is assumed that there is some synonym information that indicates that a particular index is synonymous with two other indices. For example, it is assumed that there is some synonym information indicating that there are three transmitters located on a single tower. The synonym information could be stored in various ways. For example, the synonym information could be stored as a matrix with unique transmitter IDs acting as indices of both axes and the elements of the matrix indicating a synonym weighting value between respective transmitter IDs. Further the synonym information could be provided by a plurality of tuples, or lists of synonymous transmitter IDs, that is transmitter IDs that are physically located together or close together.

As depicted, the term 616a for key-value pairs having synonyms may be calculated as a summation 652a of sub-terms 650a', 650a", 650a'". Each of the sub-terms is calculated in a similar manner as described above for the individual terms, however, rather than using the key-value pair, each sub-term 650a', 650a", 650a'" is calculated using a respective synonym of the key-value pair. As such, the number of sub-terms 650a', 650a", 650a'" used in calculating the term 616a may be determined based on the number of synonyms that exist for a particular word. Further, when considering synonyms, the key-value pair may be considered to be synonymous with itself.

Turning to the calculation of the sub-term 650a', as can be seen, the calculation of the sub-term 650a' is similar to the calculation of individual terms 416a described above with reference to FIG. 4, however, instead of using the key of the key-value pair, the key of the synonym is used. It is noted that one of the synonyms would include the key itself. The synonym information is used to determine a key 658a' of the synonym 656a' associated with the key (Key$_1$) of the key-value pair 604a, and a synonym weighting value 656a'. The synonym weighting value 656a' may be used to provide for soft synonyms, that is synonyms that have a similar, but not exact, meaning. If the application only requires exact synonyms, the synonym weighting value 656a' does not need to be used as it can be assumed to 1. In the context of radio scene signatures, the synonym weighting may be used to provide an indication of how close physically two, or more, transmitters are.

Once the key 658a' of the synonym 654a' is determined it may be used to generate a hash value along with the index value 612 of the element 608 of the signature vector being calculated. Similar to the hashes described above, the hash 628a' may be generated using a concatenation of the index value 612 of the signature element and the synonym key 658a'. The generated hash value may then be used to seed a pseudo-random number generator. The sub-term 650a' is then calculated as the product of the generated pseudo-random number, the synonym weighting value 656a' and the value (Value$_1$) of the key-value pair.

Each of the other key-value pairs 650a", 650a'" may be determined in a similar manner; however, the synonym key values and the synonym weighting values used are associated with different synonyms of the key-value pair. Once the sub-terms 650a', 650a", 650a'" associated with each synonym is determined they can be summed together. The sum of the sub-terms 650a', 650a", 650a'" may then be normalized. The summation of the sub-terms can be normalized by dividing the summation by a summation of the weighting values of the synonyms of each sub term. If only exact synonyms are allowed, this results in dividing the summation of the sub-terms by the number of synonyms. Once the term 616a is determined as the normalized sum of the synonym sub-terms, it can be summed with the other terms 616b, 616c to provide the element of the signature vector. The other terms 616b, 616c may be calculated in a similar manner as described above with term 616a if the associated key-value pair has synonyms. Alternatively, the terms 616b, 616c may be calculated as described above with reference to FIG. 4 or FIG. 5 if there are no synonyms.

It will be appreciated that the particular calculation of a radio scene signature with aliasing described above, is only a single possible way to generate the radio scene signature. That is, the particular order of the operations, such as multiplication and addition of the various values can be reordered as well understood, while still providing a compressive sensing signature. Generally, an m-dimensional radio scene signature with aliasing across synonyms can be determined according to:

$$Y_i = \sum_{l=1}^{S(V)} \frac{\sum_{r=1}^{nS(k_l)} [R(f(i, sk_{l,r}))sw_{l,r} \cdot p_l \cdot G(K_l)]}{\sum_{r=1}^{nS(k_l)} sw_{l,r}}, \quad (18)$$

for $i = 1, 2, 3, \ldots, M$

Where:
$Y_i$ is the $i^{th}$ element of the radio scene signature.
S(V) is the sparsity of the data being processed, that is the number of key-value pairs in the radio scene for which the signature is being generated.
$nS(k_l)$ is the number of synonyms associated with the $l^{th}$ key ($k_l$) of the key-value pair.
R(x) is a pseudo-random number generated from a seed x.
$f(i, sk_{l,r})$ is a hashing function of the concatenation of i and $sk_{l,r}$.
$sk_{l,r}$ is the key associated with the $r^{th}$ synonym of the $l^{th}$ key $k_l$.
$sw_{l,r}$ is the synonym weight value associated with the $r^{th}$ synonym of the $l^{th}$ key ($k_l$).

$p_l$ is the $l^{th}$ value in the set of the key-value pairs.

$l^{th}$ is a weighting factor associated with the $l^{th}$ key ($k_l$) in the set of the key-value pairs.

Figure 7:
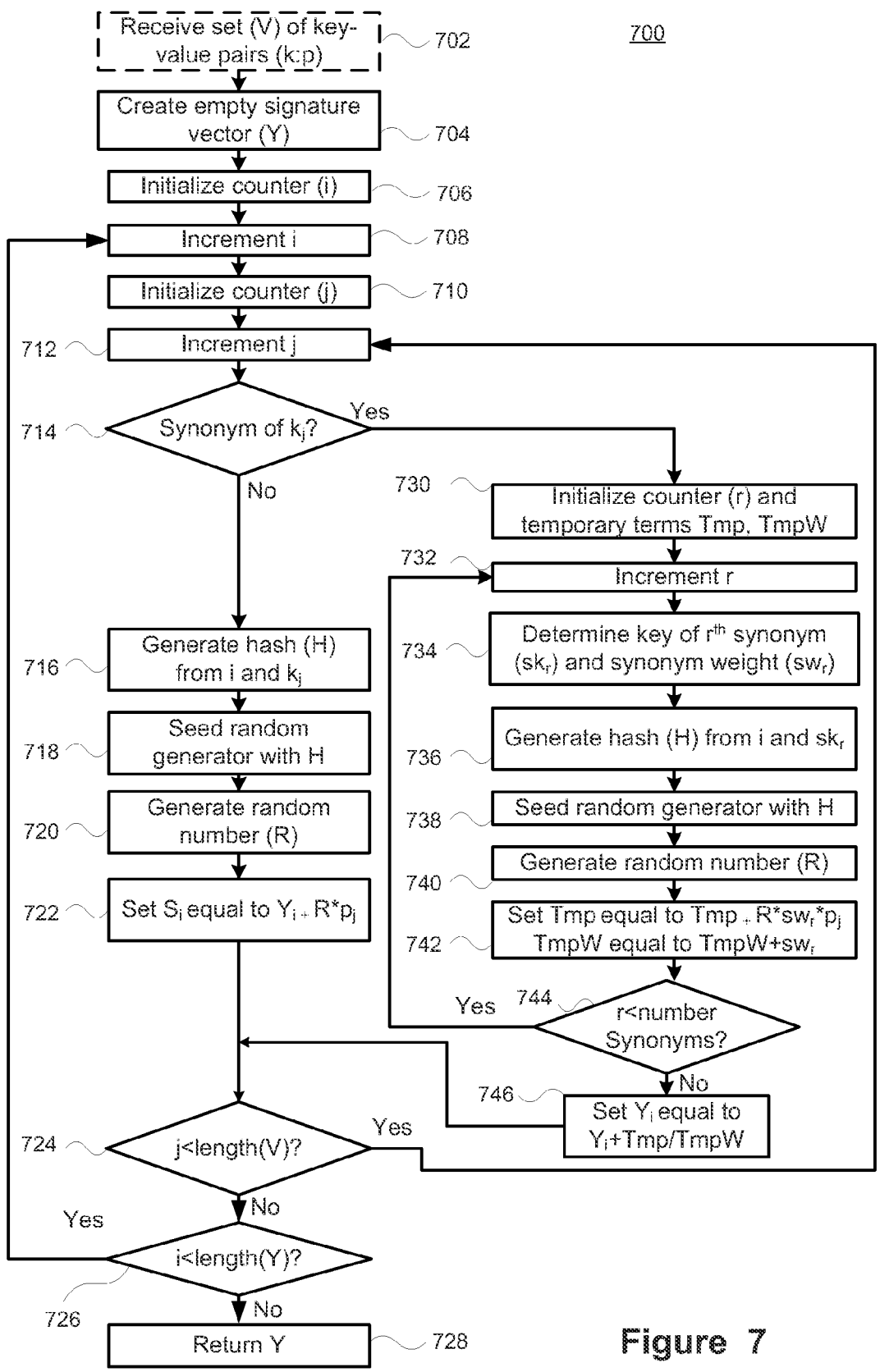
FIG. 7 depicts an illustrative method of generating a compressive sensing signature with aliasing across synonyms.

FIG. 7 depicts an illustrative method of generating a compressive sensing signature with aliasing across synonyms. The method 700 is similar to the method 500 described above with reference to FIG. 5 when the key of the key-value pair being processed is not associated with any synonyms.

The method 700 begins when a set of one or more key-value pairs is received (702). The set of key-value pairs has k non-zero elements, where k>=1. The method 140 creates an empty signature vector (Y) of m elements (704). The empty signature vector (Y) has m zero-valued elements. The method initializes a first counter (i) (706). The counter (i) is used to loop over each element in the signature vector (Y) and calculate the element's value. Once the counter is initialized, it is incremented (708). It is noted that the counter (i) is initialized to one less than the first index of the signature vector (Y) so that when it is incremented, the first element of the signature vector (Y) will be referenced. Further, it is noted that the initialization and incrementing of the counter (i) may be done implicitly, for example by using a 'for-next' loop or other programmatic functionality. Once the first counter (i) is initialized/incremented, a second counter (j) is initialized (710) and incremented (712). The second counter (j) is used to loop through each of the key-value pairs in the set to calculate the summation terms associated with the respective key-value pairs.

Once the second counter (j) is initialized/incremented, it is determined if the $j^{th}$ key-value in the set has any synonyms (714). The determination as to whether there are any synonyms may be made be searching the synonym information for the respective key. If there are no synonyms associated with key (No at 714) a hash (H) is generated from the concatenation of the first counter (i) and the $j^{th}$ key of the set key-value pairs (716). Once the hash (H) is calculated, it is used as the seed for a random number generator (718), and a random number (R) is generated from the seeded random number generator (720). Once the random number (R) is generated, the $i^{th}$ element of the signature vector Y, which was initialized to zero is set equal to $Y_i+R*p_j$, where $p_j$ is the value of the $j^{th}$ key-value pair in the set of key-value pairs (722). Once the terms have been summed, it is determined if the second counter (j) is less than the number of pairs in the set of key-value pairs (724). If the counter (j) is less than the number of pairs in the set, there are further pairs in the set to use in calculating the element in the signature vector (Y). When the counter (j) is less than the number of pairs in the set (Yes at 724), the method returns to increment the second counter (j) (712) and proceeds to incorporate the next key-value pair in the set in the calculation of $Y_i$. If the counter (j) is not less than the number of key-value pairs in the set (No at 724), then there are no further pairs in the set to use in calculating $Y_i$ and the method determines if the first counter (i) is less than the number of elements in the signature vector (Y) (726). If the counter (i) is less than the number of elements in the signature vector (Y) (Yes at 726), then there are further elements of the signature vector (Y) to calculate and the method increments the first counter (i) (708) and calculates the value of the next element of the signature vector (Y). If the first counter (i) is not less than the number of elements in the signature vector (Y) (No at 726), then all of the elements of the signature vector (Y) have been calculated and the signature vector (Y) is returned (728).

Returning to the determination of if there are any synonyms associated with the $j^{th}$ key (714), if there are associated synonyms (Yes at 714), then the element of the signature vector is calculated based on the synonyms. A further counter (r) is initialized along with a temporary term (Tmp) for holding the summation of synonym terms and a temporary term (TmpW) for holding a summation of synonym weights (730). The counter (r) is used to loop over each of the synonyms associated with the key. The counter is incremented (732). Once the counter (r) is incremented, the key ($sk_r$) and the synonym weight value ($sw_r$) of the $r^{th}$ synonym is determined (734). A hash (H) is then generated from the concatenation of the first counter (i) and the key of the $r^{th}$ synonym (736). Once the hash (H) is calculated, it is used as the seed for a random number generator (738), and a random number (R) is generated from the seeded random number generator (740). Once the random number (R) is generated, the temporary terms (Tmp) and (TmpW), which were initialized to zero are set equal to $Tmp+R*sw_r*p_j$, and $TmpW+sw_r$ respectively, where $sw_r$ is the synonym weighting value of the $r^{th}$ synonym and $p_j$ is the value of the $i^{th}$ key-value pair in the set of key-value pairs (742). It is then determined if the counter r is less than the number of synonyms (744) and if it is (Yes at 744) the method returns to increment the counter r (732). If the counter (r) is not less than the number of synonyms (No at 744), then the temporary term (Tmp) is normalized by dividing by the sum of the synonym weights, which is provided by (TmpW). The $i^{th}$ element of the signature is the set equal to the value of the $i^{th}$ element of the signature plus the normalized temporary term Tmp (746) and the method determines if there are further pairs in the set of key-value pairs (724).

As described above, a compressed sensing signature vector may be generated that provides aliasing over synonyms. Aliasing may be used in generating compressive sensing signatures for use in localization in cellular networks. Let datum $V=\{T_l, J_l\}_{l=1}^{S(V)}$ be the set of (TowerID, RSSI) pairs of all the S(V) cell towers seen by a hand-held device at one point in time. A tower ID $T_l$ is an integer of 64 bits. The 16 least significant bits (LSB) correspond to a LAC field of the ID. Towers that are no more than a few hundred meters apart tend to differ only in these LAC bits. The RSSI is a positive real value in Watts indicative of the received signal strength. The aliased compressive sensing signature of V is given by:

$$Y_i = \sum_{l=1}^{S(V)} \sum_{t=T_l-3\sigma}^{T_l} R(f(i,t)) \exp^{-\frac{(t-T_l)^2}{2\sigma^2}} \cdot J_l \qquad (19)$$

for $i = 1, 2, 3, \ldots, m$

In the above, the fixed parameter a allows control of the synonymity between a transmitter ID $T_l$ and other transmitter IDs that are close to it on the integer line. This type of synonymity may be reasonable since, as described above, transmitter with close IDs usually also have close physical proximity. Setting a close to zero will remove the synonym property from the signature.

The term $$\exp^{-\frac{(t-T_l)^2}{2\sigma^2}}$$

captures the synonimity of transmitter t to tower $T_l$. If the integer value of the transmitter $ID_t$ is close to the integer value of the transmitter ID $T_l$, the synonimity is relatively large, while synonimity decays fast when t is very different from $T_l$. Since changing the least significant bits (LSBs) cause small changes in a number while changing the most significant bits (MSBs) cause large changes, t will be close to $T_j$ as an integer when the MSBs agree, and far away otherwise. And, as described above, transmitters with similar MSBs are also usually located in close proximity physically to each other, by convention.

It is contemplated that the synonym and synonym weighting value of a particular element may be determined from the element using a formula as opposed to retrieving the information from a data structure.

Figure 8:
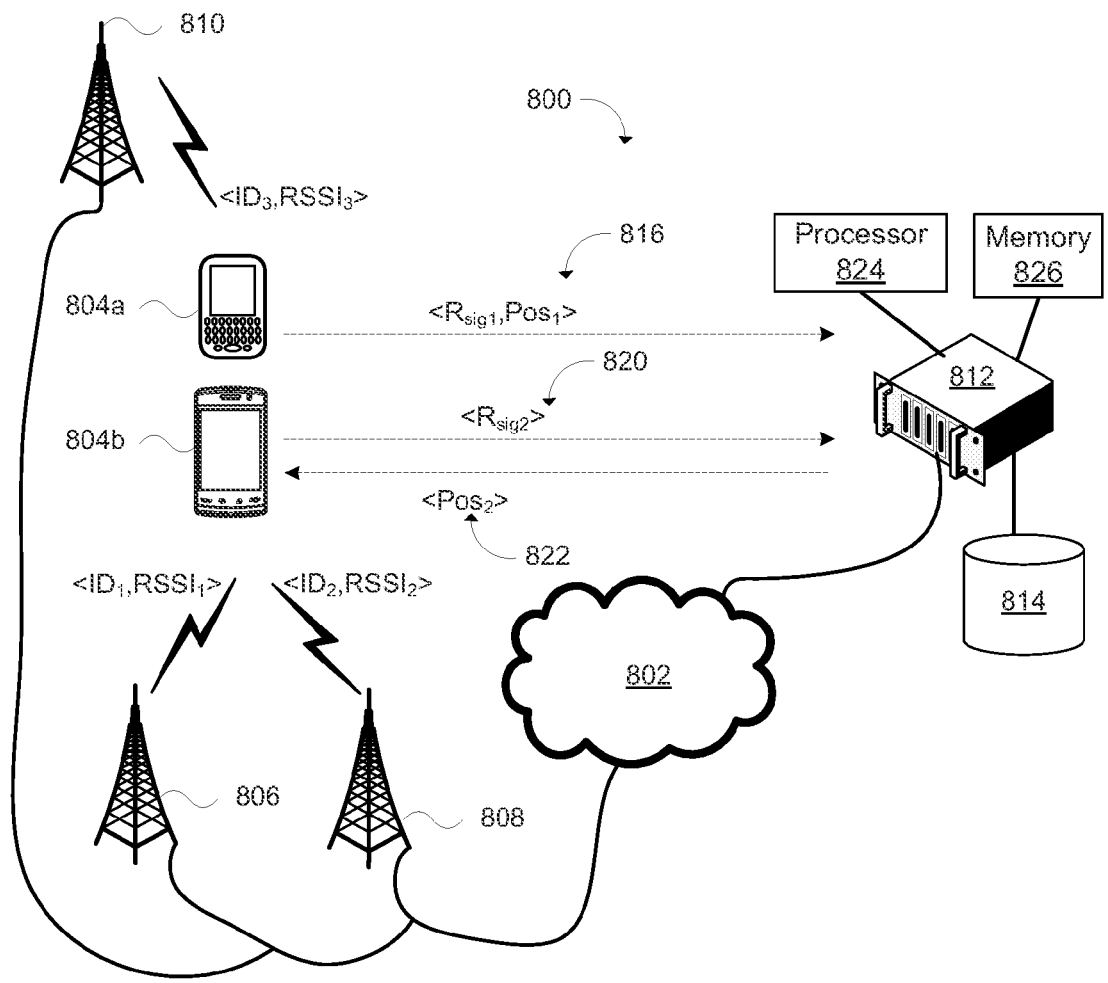
FIG. 8 depicts a further environment in which the location estimation described above may be used.

FIG. 8 depicts a further environment in which the location estimation described above may be used. The environment 800 comprises a plurality of components connected together through one or more networks 802. Two portable electronic devices 804a, 804b are depicted. In the following description it is assumed that one of the portable electronic devices 804a comprises a GPS receiver for determining a location of the portable electronic devices 804a. The other portable electronic device 804b lacks a GPS receiver and as such makes use of the location estimation described above. Each of the portable electronic device 804a, 804b includes at least one radio transceiver for communicating with wireless transceivers 806, 808, 810. The wireless transceivers 806, 808, 810 may be cellular transceivers, Wi-Fi transceivers, WiMax transceivers or other types of wireless transceivers. The portable electronic devices may communicate wirelessly with a location estimation server 812 using one or more of the cellular transceivers and the network(s) 802. The location estimation server 812 includes a database 814 or other structure for storing and accessing location information used for estimating a location of the portable electronic device 804b without a GPS receiver, although it could also provide a location estimate for portable electronic devices with GPS receivers.

In the environment 800, the portable electronic device 804a with a GPS receiver may periodically communicate its location information with the location estimation server 812. The location information 816 periodically communicated to the location estimation server 812 comprises a radio scene signature ($Rsig_1$) and associated position information ($Pos_1$). The radio scene signature ($Rsig_1$) is depicted as being generated at the portable electronic device 804a. The portable electronic device 804a receives the wireless signals from the wireless transmitters 806, 808, 810 and can determine an associated unique transmitter identifier and an associate a received signal strength indicator (RSSI) value with each determined transmitter ID. The portable electronic device 804a may then use the transmitter IDs and associated RSSI values as the key-value pairs of the visible radio scene information. This radio scene information may then be used to generate the radio scene signature ($Rsig_1$). The generated radio scene signature ($Rsig_1$) may then be associated with the location at which the radio scene was visible and sent to the location estimation server 812. The location associated with the radio scene signature ($Rsig_1$) may be determined to a high accuracy using the GPS receiver of the portable electronic device 804a. Although described as being generated on the portable electronic device 802a, it is contemplated that the radio scene information, used in generating the radio scene signature ($Rsig_1$), could be sent to the location information server 812 with the associated location. The location information server 812 may then generate the radio scene signature from the received information.

The location estimation server 812 receives the location information from the portable electronic device 804a and stores the information in the location database 814. As described above, the computational complexity of generating the location estimate scales linearly with the size of the corpus stored in the location database 814. As such, it is desirable to limit the size of the database 814. The size of the database may be limited by removing older location information. The older location information may be periodically removed from the database, or older location information may be removed as newer location information is added. Further, although described as removing older location information, it is contemplated that the removal of location information may also be based on the amount of location information in the physical area of the location. That is, older location information for a physical location or area that has relatively few pieces of location information may be maintained in the database 814, while relatively newer location information is removed from an area having a relatively large number of pieces of location information.

A single portable electronic device 804a has been described as providing location information to the location estimation server 812; however, it is contemplated that a plurality of portable electronic devices can provide the location information. Further, the portable electronic devices may periodically provide the location information, and/or portable electronic devices may provide the location information in an initial training phase in which a large number of location measurements are determined and stored in the database 814.

Turning to the portable electronic device 804b, the portable electronic device may receive the signals from the wireless transmitters 806, 808, 810. The portable electronic device 804b may identify the unique IDs of the wireless transmitters and associated RSSI values, which are then used to generate a radio scene signature ($Rsig_2$). Although depicted as being generated on the portable electronic device 804b, the radio scene information, comprising the unique IDs and associated RSSI values, could be sent to the location estimation server 812 instead of the radio scene signature ($Rsig_2$).

The portable electronic device 804b communicates the radio scene signature ($Rsig_2$) 820, or alternatively the radio scene information for generating the radio scene signature ($Rsig_2$), to the location estimation server 812. The location estimation server 812 receives the radio scene signature ($Rsig_2$), or alternatively generates the radio scene signature ($Rsig_2$), and determines an estimate of a location associated with the radio scene signature ($Rsig_2$). The location estimation server 812 uses the location information stored in the database 814 to provide the location estimate. The determined estimate of the location may then be communicated 822 back to the portable electronic device 804b, which may then use the location estimate to provide various location based services.

Figure 9:
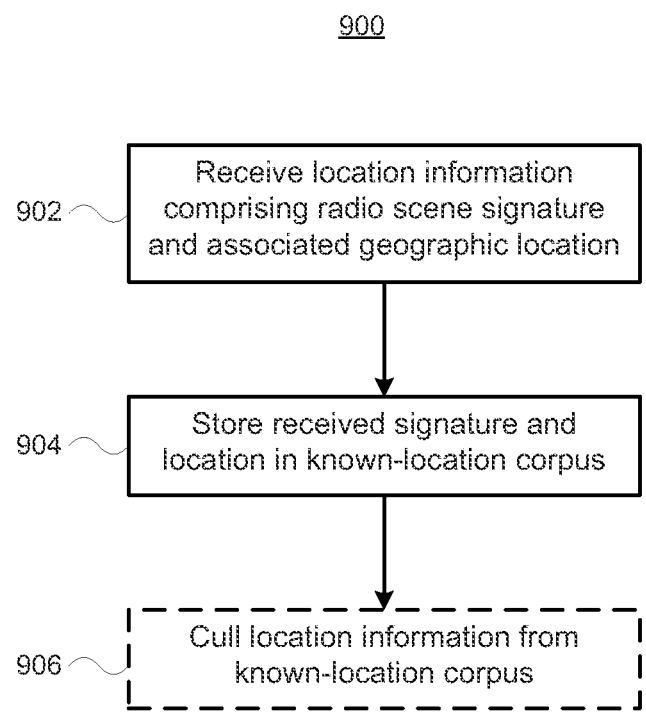
FIG. 9 depicts a method of maintaining a database of location information.

FIG. 9 depicts a method of maintaining a database of location information. The method 900 may be used to maintain the corpus of location information used in generating location estimates as described above. The method 900 may be provided by the execution of instructions, stored in memory 826, by a processor 824 of the location estimation server 812 described above with reference to FIG. 8.

The method 900 receives location information, comprising a radio scene signature and an associated geographic location (902). The location information may be determined by a portable electronic device using a GNSS receiver, or other means of determining the location with a relatively high degree of accuracy. The radio scene signature is generated from radio scene information, comprising one or more key-value pairs of transmitter IDs and RSSI values. The radio scene signature may be generated from the radio scene information at the portable electronic device or at the location estimation server. Once the location information is received the method stores the location information in a corpus (904)

of known locations and associated radio scene signatures that were visible by a portable electronic device at the location. The corpus may also store a time or date associated with when the location information was collected.

The method may further comprise culling older location information from the stored corpus (906). The culling of location information may be done periodically, for example, once a month, once a week, once a day, once an hour or at other frequencies. Additionally or alternatively, the location information may be culled when the corpus of known locations exceed a particular size. Further, older location information may be culled from the corpus as new location information is stored. The culling of the older location information may be done based solely on the associated age of the location information, so that the oldest location information is culled first. Alternatively, the location information may be culled based on the age of the location information, as well as the amount of location information associated with a particular location, so that old location information associated with areas having little location information is not culled from the corpus, while relatively newer location information associated with areas with a relative abundance of location information is culled from the corpus.

Figure 10:
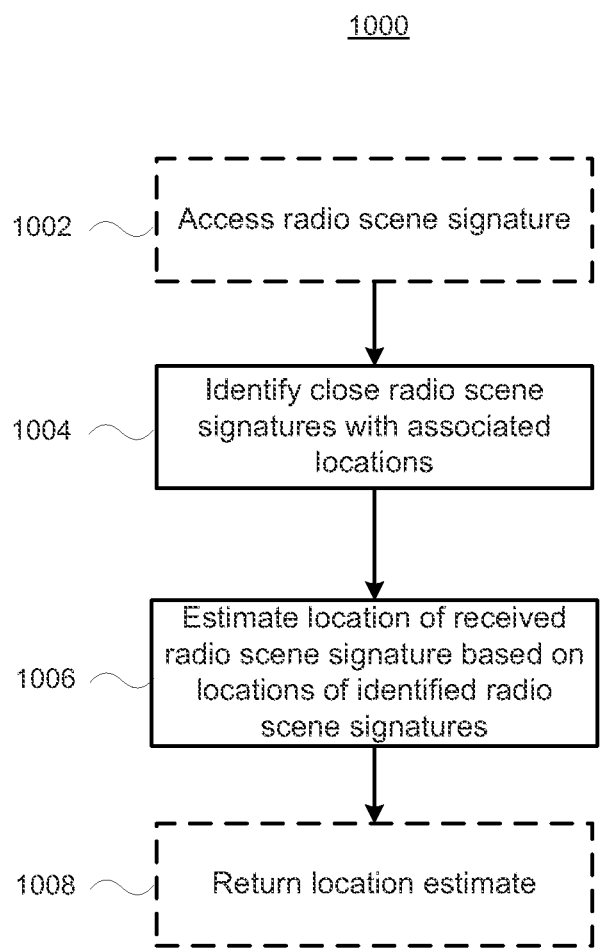
FIG. 10 depicts a method of estimating a location of a portable electronic device.

FIG. 10 depicts a method of estimating a location of a portable electronic device. The method 1000 may be used to provide a location estimate to a portable electronic device based on the radio scene visible at the portable electronic device as described above. The method 1000 may be provided by the execution of instructions, stored in memory, by a processor of the location estimation server described above.

The method 1000 accesses a radio scene signature (1002) generated from radio scene information, comprising key-value pairs of at least on transmitter ID and associated RSSI value visible from a portable electronic device. The radio scene signature may be generated at the portable electronic device and received at the location estimation server, or alternatively, may be generated at the location estimation server and accessed by the location estimation server. The method uses the radio scene signature to identify or retrieve radio scene signatures that are close to accessed radio scene signature and are associated with known locations (1004). A corpus storing radio scene signatures and associated known locations can be searched when identifying radio scene signatures that are close to the accessed radio scene signature. An estimate of the location of the portable electronic device may then be generated based on the known locations associated with the radio scene signatures identified to be close to the accessed radio scene signature (1006). The location estimate may be determined as an average of the retrieved known locations. The estimate of the location may then be communicated back to the portable electronic device (1008).

The above has described determining locations based on received RF signals, including signals received from cellular transmitters. Reference to cellular transmitters is intended to included other RF or wireless mobile network technologies that can provide voice and or data transmission to portable electronic devices.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of estimating a location of a portable electronic device, the method comprising:
   accessing a query signature vector of a radio scene identifying radio frequency transmitters and associated signal strengths detected at the portable electronic device, the query signature vector representing data from a high-dimensional space in a low-dimensional vector;
   identifying one or more radio scene signature vectors based on a similarity with the query signature vector, each of the identified one or more radio scene signature vectors having an associated location, the one or more radio scene signature vectors representing data from the high-dimensional space in a respective low-dimensional vector; and
   estimating the location of the portable electronic device based on the associated locations of the identified one or more signatures.

2. The method of claim 1, wherein the identified one or more radio scene signature vectors are within a threshold distance of the query radio scene signature vector.

3. The method of claim 1, wherein the identified one or more radio scene signature vectors are the k-closest radio scene signature vectors relative to the query radio scene signature vector,
   where k>=1.

4. The method of claim 1, wherein a plurality of radio scene signature vectors are identified and wherein estimating the location of the portable electronic device comprises averaging the locations associated with the plurality of identified radio scene signatures.

5. The method of claim 4, wherein estimating the location of the portable electronic device further comprises estimating an uncertainty associated with the average of the locations associated with the plurality of identified radio scene signatures.

6. The method of claim 5, wherein the uncertainty is estimated as an average absolute deviation between each of the retrieved locations and the estimation of the location.

7. The method of claim 1, further comprising generating the query radio scene signature vector comprising:
   accessing a set of key-value pairs, each comprising a respective key, corresponding to a unique transmitter identifier and a value associated with a signal strength, from the respective transmitter, received at the portable electronic device; and calculating each vector element of the query radio scene signature vector based on a summation of a plurality of terms each based on a respective pair in the received set of key-value pairs.

8. The method of claim 7, wherein each term is calculated from a respective key-value pair by:
generating a seed based on the key of the respective key-value pair and an element identifier associated with the vector element being calculated;
generating a pseudo-random number from the generated seed; and
multiplying the pseudo-random number by the value of the respective key-value pair.

9. The method of claim 7, wherein the query radio scene signature vector is generated at the portable electronic device.

10. The method of claim 7, wherein at least one of the keys of the plurality of key-value pairs is associated with one or more synonymous unique identifiers of transmitters located in close proximity to each other, wherein when the key of the respective key-value pair is associated with one or more synonymous unique identifiers, the term in the summation calculated by further adding one or more sub-terms, each calculated from a respective synonymous unique identifier of the one or more synonymous unique identifiers associated with the key of the respective key-value pair by:
generating a synonym seed based on the respective synonymous unique identifier and the element identifier associated with the vector element being calculated;
generating a synonym pseudo-random number from the generated synonym seed; and
multiplying the synonym pseudo-random number by the value of the respective key-value pair.

11. The method of claim 1, wherein the identified one or more radio scene signature vectors are located in a corpus of radio scene signatures and associated locations.

12. The method of claim 1, further comprising:
returning the estimated location to the portable electronic device from a server.

13. The method of claim 1, further comprising:
receiving location information comprising a known radio scene signature vector, or information for generating the known radio scene signature vector, and associated known location; and
updating a corpus of location information using the received location information.

14. The method of claim 1, wherein the radio frequency transmitters are identified in the composite radio scene signature by a unique radio frequency (RF) transmitter address comprising a media access control (MAC) address or cellular transmitter identifier.

15. A device for estimating a location of a portable electronic device, the device comprising:
a memory containing instructions; and
a processor for executing instructions, the instructions when executed configuring the device to:
access a query signature vector of a radio scene identifying radio frequency transmitters and associated signal strengths detected at the portable electronic device, the query signature vector representing data from a high-dimensional space in a low-dimensional vector;
identify one or more radio scene signature vectors based on a similarity with the query signature vector each of the identified one or more radio scene signature vectors having an associated location, the one or more radio scene signature vectors representing data from the high-dimensional space in a respective low-dimensional vector; and
estimate the location of the portable electronic device based on the associated locations of the identified one or more signatures.

16. The device of claim 15, wherein the identified one or more radio scene signature vectors are within a threshold distance of the query radio scene signature vector.

17. The device of claim 15, wherein the identified one or more radio scene signature vectors are the k-closest radio scene signature vectors relative to the query radio scene signature vector,
where k>=1.

18. The device of claim 15, wherein a plurality of radio scene signature vectors are identified and wherein estimating the location of the portable electronic device comprises averaging the locations associated with the plurality of identified radio scene signatures.

19. The device of claim 18, wherein estimating the location of the portable electronic device further comprises estimating an uncertainty associated with the average of the locations associated with the plurality of identified radio scene signatures.

20. The device of claim 19, wherein the uncertainty is estimated as an average absolute deviation between each of the retrieved locations and the estimation of the location.

21. The device of claim 15, wherein the instructions, when executed further configure the device to generate the query radio scene signature vector by:
accessing a set of key-value pairs, each comprising a respective key, corresponding to a unique transmitter identifier and a value associated with a signal strength from the respective transmitter received at the portable electronic device; and
calculating each vector element of the query radio scene signature vector based on a summation of a plurality of terms each based on a respective pair in the received set of key-value pairs.

22. The device of claim 21, wherein each term is calculated from a respective key-value pair by:
generating a seed based on the key of the respective key-value pair and an element identifier associated with the vector element being calculated;
generating a pseudo-random number from the generated seed; and
multiplying the pseudo-random number by the value of the respective key-value pair.

23. The device of claim 21, wherein at least one of the keys of the plurality of key-value pairs is associated with one or more synonymous unique identifiers of transmitters located in close proximity to each other, wherein when the key of the respective key-value pair is associated with one or more synonymous unique identifiers, the term in the summation calculated by further adding one or more sub-terms, each calculated from a respective synonymous unique identifier of the one or more synonymous unique identifiers associated with the key of the respective key-value pair by:
generating a synonym seed based on the respective synonymous unique identifier and the element identifier associated with the vector element being calculated;
generating a synonym pseudo-random number from the generated synonym seed; and
multiplying the synonym pseudo-random number by the value of the respective key-value pair.

24. The device of claim 15, wherein the identified one or more radio scene signature vectors are located in a corpus of radio scene signatures and associated locations.

25. The device of claim 15, further comprising:
   returning the estimated location to the portable electronic device from a server.

26. The device of claim 15, further comprising:
   receiving location information comprising a known radio scene signature vector, or information for generating the known radio scene signature vector, and associated known location; and
   updating a corpus of location information using the received location information.

27. A computer readable memory containing instructions for estimating a location of a portable electronic device, the instructions which when executed by a processor perform the method of:
   accessing a query signature vector of a radio scene identifying radio frequency transmitters and associated signal strengths detected at the portable electronic device, the query signature vector representing data from a high-dimensional space in a low-dimensional vector;
   identifying one or more radio scene signature vectors based on a similarity with the query signature vector each of the identified one or more radio scene signature vectors having an associated location, the one or more radio scene signature vectors representing data from the high-dimensional space in a respective low-dimensional vector; and
   estimating the location of the portable electronic device based on the associated locations of the identified one or more signatures.

* * * * *